Aug. 30, 1932.  R. B. WILLIAMSON  1,873,989
DYNAMO ELECTRIC MACHINE VENTILATION
Filed Feb. 14, 1931
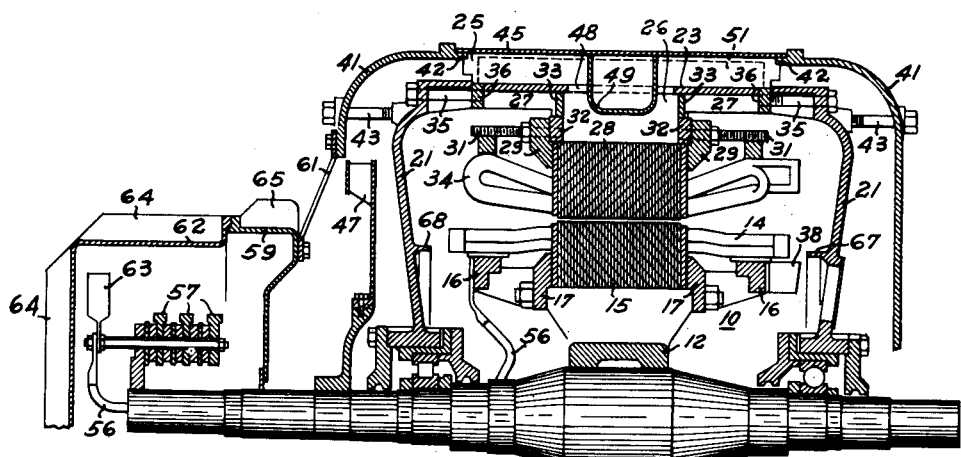
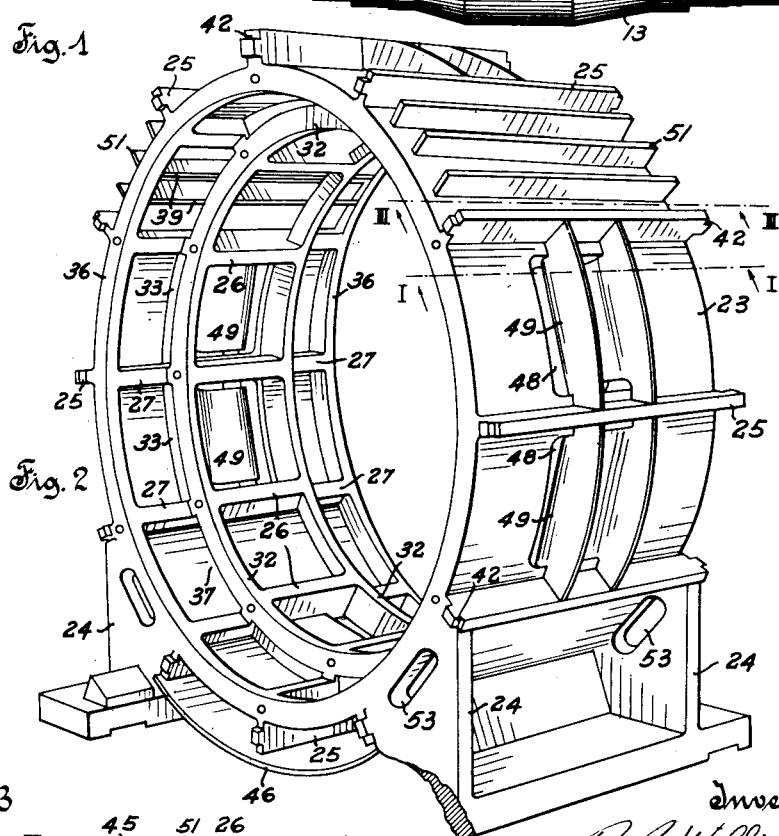
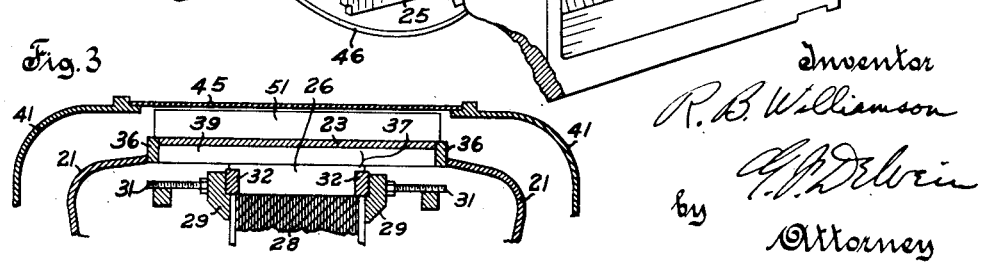

Patented Aug. 30, 1932

1,873,989

UNITED STATES PATENT OFFICE

ROBERT B. WILLIAMSON, OF MILWAUKEE, WISCONSIN, ASSIGNOR TO ALLIS-CHALMERS MANUFACTURING COMPANY, OF MILWAUKEE, WISCONSIN, A CORPORATION OF DELAWARE

DYNAMO-ELECTRIC MACHINE VENTILATION

Application filed February 14, 1931. Serial No. 515,673.

This invention relates in general to dynamo-electric machines, and is more particularly concerned with such machines of the type which is enclosed to a substantial extent while still providing adequate cooling or dissipation of heat generated during operation of the machine.

Dynamo-electric machines of the enclosed type present a considerable problem in the matter of properly enclosing the active electrical portions of the machine and isolating the same against entrance of dust and moisture and other destructive agents, while still utilizing a relatively simple and inexpensive design of machine.

An object of the present invention is to provide an improved design of dynamo-electric machine of the enclosed type involving a relatively simple and inexpensive construction and securing effective cooling of the machine through dissipation of heated air from the enclosing walls thereof; and, as additional features or objects, the invention provides for the effective circulation of cooling currents across portions of the outer surface of the enclosure and of the air within the enclosed chamber for the purpose of augmenting the rate of dissipation of heat from the housing.

And it is a further object of this invention to provide an improved design and construction of dynamo-electric machine of the enclosed type embodying a stator element including provisions for bringing cooling fluid from the outside of the machine into direct contact with the core of the stator, while still retaining the active parts of the machine wholly enclosed.

These and other objects and advantages are attained by the present invention, various novel features of which will be apparent from the description and drawing, disclosing an embodiment of the invention, and will be more particularly pointed out in the claims.

In the drawing:

Fig. 1 is a broken sectional elevation of a dynamo-electric machine embodying features of the present invention, the section being in the plane of the line I—I of Fig. 2.

Fig. 2 is a perspective view of the stator frame of the machine of Fig. 1.

Fig. 3 is a broken sectional view in the plane of the line III—III of Fig. 2.

In accordance with the disclosure of the drawing, illustrating a dynamo-electric machine of the wound rotor induction motor type and embodying features of the present invention, the rotor 10 which is carried by a supporting hub or spider 12, mounted on the shaft 13, is of more or less usual design, with the distributed secondary winding 14 disposed in peripheral slots of the core 15, and end turns of the winding being supported or held against an annular element 16 carried by spaced arms mounted on end plates or rings 17 which are used for clamping the laminæ of the core in assembled condition and mounting the same upon the spider or support 12. The rotor shaft 13 is mounted in bearings of conventional type carried by end closures or bearing brackets or supporting plates 21, preferably of such formation as to be inclined inwardly to produce a compact enclosure for the motor parts. The end closures 21 are supported on the stator yoke or frame 23 which includes a generally cylindrical body portion carried upon spaced supporting feet 24 at each side united by base plates. The cylindrical portion of the stator frame is provided with external ribs 25 extending axially across its entire outer face, and with correspondingly spaced axially extending ribs 26 on its inner periphery, these internal ribs being preferably in substantial alinement with the external ribs 25, and being substantially cut away or reduced at their side or end portions, as indicated at 27, to leave these portions of reduced radial depth.

The laminæ of the stator core 28 are assembled in position on the intermediate portions of the ribs or projections 26 and are clamped in position thereon by means of clamping rings or plates 29 bearing on the outer laminæ or stiffening plates associated therewith, and are held in position by bolts 31 passing through the clamping rings 29 and into or through the ribs 26 or an annular plate-like portion 32 formed integral with or secured, as by welding, to the ribs 26 and wholly or substantially closing the spaces between the inwardly extending portions of adjacent ribs 26 at the ends thereof. This annular element 32 has spaced portions, indicated at 33, and shown as of reduced thickness, at the outer periphery thereof which abut against or are formed integral with, as by welding to, the cylindrical body portion 23 to thereby close the spaces at the sides between certain adjacent ones of the ribs 26.

The clamping bolts 31 are preferably provided with extensions which serve as supports for devices for bracing or holding in position the end turns of the stator winding 34.

The end closures 21, with the shaft bearings mounted thereon, are held in position by spaced bolts 35 passing through peripheral enlargements on the end closures and into the reduced end portions 27 of the ribs or projections 26, or into an annular plate-like element or portion 36, secured to or formed integral with, as by welding to, the ends of the reduced portions 27 and the edge of the cylindrical body portion of the frame 23. The outer periphery of the end closures 21 is suitably machined to form an air-tight closure with a correspondingly machined surface upon edges of the body portion 23 of the stator yoke or the annular plate-like element 36 associated therewith, the peripheral edge of the cover plate being indicated as disposed radially within the extreme ends of the ribs 25.

With the end closures 21 secured in operative position, the interior of the motor with the active current carrying parts thereof are enclosed so as to be isolated from the outer atmosphere, the spaces at both ends of the motor within the end closures communicating with each other at spaced points through ducts, indicated at 37, formed between adjacent internal ribs 26, access to and from these ducts being provided through the spaces formed between the outer peripheral edge of the annular plate-like element 32 and the inner periphery of the body portion of the yoke 23.

A most convenient and effective method of circulating air within this enclosure and about the active motor parts includes the use of a fan element, such as may be provided by spaced blades 38 mounted on the supporting element 16 for the end turns of the rotor winding 14, these vanes serving, during operation of the motor, to circulate air in the above described path. Heat is taken up by the air from the core and winding parts; and as the circulating air is brought into contact with the inner walls of the end closures 21 and the stator frame 23, heat is extracted from this air by these casing parts. To further facilitate the removal of heat from the air currents passing in this closed path, auxiliary ribs 39 may be provided on the inner periphery of the body portion 23 of the casing, these ribs projecting into the air ducts 37, and presenting additional contact surface which permits the casing to better serve for the purpose of absorbing heat from the circulating air.

As indicated, annular side cover plates of the character of hoods or shields 41 are provided outside of the end closures 21, the axially extending edge portions of these cover plates being suitably machined for bearing against recessed shoulders formed at the ends of the external ribs 25, as indicated at 42; and these cover plates 41 are held in operative position by means of spaced bolts 43 which are secured to the end closures 21.

A sheet metal cover plate 45, which may be of flexible sheet such as is ordinarily used for lagging, is preferably detachably held in position, as by means of screws or bolts, passing into the external ribs 25, and extends about the upper and side portions of the stator frame or casing and downwardly to the feet 24 on each side thereof. An auxiliary cover plate 46 is disposed at the lower side of the frame between the spaced feet 24, and this auxiliary cover plate is likewise held in position, as by means of screws or bolts passing into the ribs 25.

With the peripheral cover plates 45, 46 secured in position, and with the edges of the cover plates or guards 41 disposed with a close fit under the side edges of the peripheral plates 45 and 46, an annularly arranged series of spaces is formed for the passage of cooling air which may be supplied by a fan 47 of suitable design and carried by the shaft at one end of the machine; and the air from the fan comes into contact with and dissipates heat from the body portion of the casing or frame, and the ribs 25 and 39 thereof, and the end closures 21.

At suitably spaced points, corresponding to the positions at which partitions are formed by the reduced extensions 33 of the annular plate 32 at the inner periphery of the frame, apertures 48 are provided through the intermediate part of the body portion of the frame or yoke 23, the width of these openings 48 preferably approximating the full width of the stator core, and these openings giving access to the space at the rear or outer periphery of the stator laminæ.

In or associated with each of the apertures 48, there is disposed a deflector 49 for air currents passing in a generally axial direction through the spaces between the casing or yoke element 23 and the peripheral cover plates 45, 46. These deflectors 49 may be formed of sheet metal and are preferably of generally U or channel shape in radial cross section, as indicated in Fig. 1, the trough or inner end portion of the deflector extending preferably well into the space between the body portion of the casing element 23 and the outer periphery of the stator core 28. Portions of the side walls outside of the casing 23 extend peripherally into engagement with the sides of adjacent ribs 25, the outer ends of these side walls extending sufficiently to be substantially flush with the outer edges of the ribs 25, and hence so that the peripheral cover plates 45, 46 engage the outer curved edges of these side walls of the several deflectors; and thus the side walls of the channels effectively obstruct the passage of air directly across the axial spaces between the body portion of the yoke 23 and the peripheral cover plates 45, 46. And these deflectors are of such size and so positioned in the openings 48 as to leave a passage of substantial size between the side walls of the deflector and the side edges of the openings 48. Through this arrangement, all of the air passes beneath the deflector and into effective contact with the outer periphery of the laminated core 28. The channels 49 are held in position in any suitable manner, a convenient manner being to weld the extending edges of the side walls of the channels to the adjacent faces of the external ribs 25.

The cross-sectional shape of the deflector, as to the direction in which the side walls extend, and the shape of the inner end of the channel and the degree to which it extends towards the outer periphery of the core laminæ are such as best insure the passage of ample ventilating currents into contact with a substantial portion of the outer surface of the core laminæ, thus insuring effecting dissipation of heat directly from the core.

To increase the heat dissipated from those portions of the stator yoke 23 which are not provided with apertures 48, and the corresponding air deflectors 49, additional ribs 51 may be provided extending outwardly to a point where the cover plate 45, when in operative position, will engage, or substantially so, with the outer edges of such ribs.

The feet 24 are apertured, as indicated at 53, the apertures being in substantial alinement and so disposed that when the side cover plates 41 are in position, a portion of the air from the fan 47 passes through the apertures 53 in the adjacent feet and thence along the outer face of the yoke and through the openings 53 in the other feet, discharging into the space within the corresponding cover plate or guard 41.

Leads 56 from the rotor winding 14 pass to the outer side of the enclosure formed by the end closures 21, through channels or slots in the shaft 13, to the appropriate collector rings, indicated at 57, insulated from each other and mounted to rotate with the shaft 13.

A protective housing is provided about the collector rings and brushes associated therewith, and this housing comprises a portion 59 preferably carried by an annular open frame, or a series of brackets, 61 preferably secured to the adjacent end cover plate 41, this housing portion having a close air-tight fit with the shaft 13, and a second housing portion 62 mounted on and detachable from the portion 59 and, when in position, forming with the portion 59 a close fit to provide therewith a substantially air-tight closure for the collector rings and brushes. The annular open frame 61 constitutes the inlet to the casing or chamber for the fan 47; and a suitable screen may be provided over the openings in the frame 61.

During operation of the machine, the fan 47 draws air into the enclosure through the open work frame 61, and a substantial portion of this air passes along and in direct contact with the outer surface of the enclosure 59, 62 for the collector rings, thus serving to remove heat from such enclosure. To further facilitate efficient cooling of the collector rings and brushes, a fan may be provided, the same being illustrated as comprising a plurality of fan blades 63 suitably mounted in position, as upon rods which serve as a portion of the connection from the leads 56 to the collector rings, this fan producing violent movement of the air within the casing. And the exterior of the casing parts 62 and 59 may be provided with corrugations or heat radiating fins 64 and 65, respectively, the action of these projections or fins being to further facilitate the removal of heat from the enclosure 62, 59 through the action of the air drawn to the inlet of the fan 47 during the operation of the machine.

Under normal operating conditions, the fan blades 38 serve to produce a continuous circulation of air within the enclosed motor, this air passing from the fan, through the end turns of the windings and in contact with the walls of the adjacent end closure 21, thence through the ducts 37, and in contact with the inner periphery of the stator casing 23, with its inwardly projecting ribs 26 and 39, and the outer periphery of the stator laminæ and thence inwardly through the end turns of the windings at the other side of the core and in contact with the corresponding end closure 21, thence axially through the rotor spider to the inlet of the fan elements 38. The end closures 21 may be provided with annular projections, such as that indicated at 67, 68, which serve to determine the path of the circulating air within the housing, the projection 67 cooperating with the fan blades as a portion of a housing therefor. During this circulation of the air in this closed path within the housing enclosure made up of the casing element 23 and the end closure plates 21, heat is abstracted from the circulating air. And the air currents induced by the fan 47, the adjacent end closure 21 and side cover plate 41 constituting a chamber or housing for the fan and the air currents induced thereby; and these air currents pass through the spaces between the peripheral cover plates 45, 46 and the stator casing element 23, particularly because of the presence of the deflector elements 49, associated with the openings 48 in the casing element 23, which cause a large volume of this air to pass into direct contact with the outer periphery of the stator laminæ; and his circulating air serves to remove the heat from the walls of the inner enclosure and the stator core. And through the provision of the specially formed enclosure for the collector rings and brushes, with its heat radiating projections or fins, this element of the motor is effectively cooled through the action of the same fan 47 which serves to dissipate the heat from the inner motor enclosure and directly from a portion of the stator laminæ.

It should be understood that it is not desired that the invention claimed be limited to the exact details of construction shown and described herein, for obvious modifications within the scope of the invention defined by appended claims will occur to persons skilled in the art.

It is claimed and desired to secure by Letters Patent:

1. A dynamo-electric machine, comprising a stator yoke, end closures forming with said yoke an enclosure for the rotor and stator cores and windings of said machine, the stator core being supported on and spaced from the body portion of said yoke at certain points to provide ventilating passages between said body portion and the outer periphery of the stator core and opening into the spaces within said end closures, an enclosing casing radially outside of said yoke and spaced from the body portion thereof, said body portion being apertured at spaced points out of communication with said ventilating passages to provide access of external air to the outer periphery of said stator core, and means for circulating air within said yoke and said end closures and through the passages between said yoke and the outer periphery of the stator core.

2. A dynamo-electric machine, comprising a stator yoke, end closures forming with said yoke an enclosure for the rotor and stator cores and windings of said machine, the stator core being supported on and spaced from the body portion of said yoke to provide ventilating passages between said body portion and the outer periphery of the stator core and opening into the spaces within said end closures, an enclosing casing radially outside of said yoke and spaced from the body portion thereof, said yoke being constructed to provide apertures affording access of external air to the outer periphery of said stator core at spaced points while preventing access of external air to said spaces within said end closures, means for circulating cooling fluid through the space between said yoke and said outer enclosing casing, and means for insuring a through circulation of air within said yoke and said end closures and through the passages between said casing element and the outer periphery of the stator core.

3. A dynamo-electric machine, comprising a stator yoke, end closures forming with said yoke an enclosure for the rotor and stator cores of said machines, said yoke having internal ribs thereupon extending in a direction having an axial component and providing a plurality of spaced apart ventilating passages communicating with the spaces within said end closures, the stator core being supported within said internal ribs, an enclosing casing radially outside of said yoke and spaced from the body portion thereof, the space between said yoke and said enclosing casing being open to receive external air, the body portion of said yoke being apertured at points out of radial alinement with said passages between said internal ribs on said yoke to provide access to the outer periphery of the stator core, and means for closing communication between the space within said end closures and said openings through the body portion of said yoke.

4. A dynamo-electric machine, comprising a stator yoke, end closures forming with said yoke an enclosure for the rotor and stator cores of said machine, the body portion of said yoke having internal and external ribs thereupon extending in a direction having a substantial axial component, the stator core being supported within said internal ribs and the latter providing a plurality of spaced through ventilating passages communicating with the spaces within said end closures, an enclosing casing radially outside of said yoke and spaced from the body portion thereof through the intermediary of the external ribs thereon, the space between said enclosing casing and said yoke being open to receive external air, the body portion of said yoke being apertured at spaced points out of radial alinement with the through passages formed between said internal ribs to provide access to the outer periphery of the stator core, means for circulating cooling fluid through the space between the body portion of said yoke and said outer enclosing casing, and means for circulating air within said first casing element and said end closures and through the passages formed between the body portion of said yoke and the outer periphery of the stator core.

5. A dynamo-electric machine, comprising a stator yoke, end closures forming with the body portion of said yoke an enclosure for the rotor and stator cores and windings of said machine, said body portion having internal ribs thereupon extending in a direction having a substantial axial component, the stator core being supported within said internal ribs and the latter providing a plurality of spaced apart through ventilating passages communicating with the spaces within said end closures, an enclosing casing radially outside of said yoke and spaced from the body portion thereof, the space between said enclosing casing and the body portion of said yoke being open to receive external air, said casing element being apertured at points out of radial alinement with the through passages between said internal ribs to provide access to the outer periphery of the stator core at said points, communication between the spaces within said end closures and the openings through said casing being closed, deflector means associated with said yoke at said openings therein for guiding air currents upon the outer periphery of the stator core laminæ, and means for circulating air currents through the space between said outer enclosing casing and the body portion of said yoke and about said reflector means onto the stator core.

6. A dynamo-electric machine, comprising a stator yoke, end closures forming with the body portion of said yoke an enclosure for the rotor and stator cores and windings of said machine, said body portion having internal and external ribs thereupon extending in a direction having a substantial axial component, the stator core being supported within said internal ribs and the latter providing a plurality of spaced apart through ventilating passages communicating with the spaces within said end closures, an enclosing casing radially outside of said yoke and spaced from the body portion thereof through the intermediary of the external ribs thereon, the space between said enclosing casing and said yoke being open to receive ventilating currents from an external source, the body portion of said yoke being apertured at points out of radial alinement with the through passages between said internal ribs to provide access to the outer periphery of the stator core at said points, said yoke including means for closing communication between the spaces within said end closures and the peripheral openings through said yoke, deflector means associated with said yoke at said openings therein for guiding air currents onto the outer periphery of the stator core laminæ, means for circulating air within said first casing element and said end closures and through the passages between the body portion of said yoke and the outer periphery of the stator core, and means for circulating cooling fluid through the space between said outer enclosing casing and the body portion of said yoke and about said deflector means.

7. A dynamo-electric machine, comprising a stator yoke, end closures forming with the body portion of said yoke an enclosure for the rotor and stator cores and windings of said machine, said body portion having internal and external rib-like projections thereupon which extend in a direction having a substantial axial component, an enclosing casing radially outside of said yoke and spaced from the body portion thereof through the intermediary of said external ribs, the body portion of said yoke being apertured at spaced points to provide access to the outer periphery of the stator core, deflector means associated with the body portion of said yoke at said openings for guiding air currents radially inwardly upon the outer periphery of the stator core laminæ and radially outwardly therefrom, said deflector means comprising a deflecting element extending into each opening in the body portion of said yoke and free of the side walls of said opening and obstructing the through axially extending passage between adjacent external ribs on said yoke and effective to force ventilating currents to pass inwardly past said deflecting element and into contact with the outer periphery of the stator core laminæ.

8. A dynamo-electric machine, comprising a stator yoke, end closures forming with the body portion of said yoke an enclosure for the rotor and stator cores and windings of said machine, said body portion having internal and external rib-like projections thereupon which extend in a direction having a substantial axial component, an enclosing casing radially outside of said yoke and spaced from the body portion thereof through the intermediary of said external ribs, the body portion of said yoke being apertured at spaced points to provide access to the outer periphery of the stator core, deflector means associated with the body portion of said yoke at said openings for guiding air currents radially inwardly upon the outer periphery of the stator core laminæ and radially outwardly therefrom, said deflector means comprising portions projecting within the openings in the body portion of said yoke, and means for circulating cooling fluid through the space between said outer enclosing casing and the body portion of said yoke and about said deflector means.

9. A dynamo-electric machine, comprising a stator yoke, end closures forming with said yoke an enclosure for the rotor and stator cores and windings of said machine, the body portion of said yoke having external rib-like projections thereupon which extend in a direction having a substantial axial component, an enclosing casing radially outside of said yoke and spaced from the body portion thereof, said yoke being apertured at spaced points to provide access to the outer periphery of the stator core, deflector means associated with said yoke at said openings therein for guiding air currents inwardly upon the outer periphery of the stator core laminæ and outwardly therefrom, said deflector means comprising an element of channel shape in cross-section having its closed end disposed within an opening in said yoke and extending inwardly toward the outer periphery of the stator core laminæ and its legs extending outwardly toward and into substantial engagement with said outer enclosing casing to cause air currents moving between said enclosing casing and the body portion of said yoke to pass inwardly through the openings in said casing element and along the periphery of said stator core and to discharge outwardly through said openings.

10. A dynamo-electric machine, comprising a stator yoke, end closures forming with said yoke an enclosure for the rotor and stator cores and windings of said machine, the stator core being supported on and spaced from the body portion of said yoke through the intermediary of internal ribs on the latter to provide a plurality of through ventilating passages opening into the spaces within said end closures, an enclosing casing radially outside of said yoke and spaced from the body portion thereof, fan means disposed outside of and adjacent one of said end closures and concentric with the rotor shaft for circulating air through the space between said yoke and said outer enclosing casing, and an annular shield mounted in position on one end of said yoke and forming an extension of the ventilating space between said yoke and said enclosing casing and constituting a guide casing for air currents from said fan means, current collecting devices for said machine disposed outside of said latter end closures, and an enclosing casing for said current collecting devices supported from said annular shield and having its outer periphery in position such that air drawn into said ventilating conduit by said fan means passes along and in contact with the outer periphery of said latter enclosing casing.

11. A dynamo-electric machine, comprising a stator yoke, end closures forming with said yoke an enclosure for the rotor and stator cores of said machine, the stator core being spaced from a body portion of the yoke to provide ventilating passages communicating with the spaces within said end closures while preventing communication with the external air, an enclosing casing radially outside of said yoke and spaced from the body portion thereof, the space between said yoke and said enclosing casing being open to receive external air, the body portion of said yoke being apertured to provide access to the outer periphery of the stator core, and means for causing flow of a cooling fluid through the space between said enclosing casing and the body portion of said yoke.

12. A dynamo-electric machine, comprising a stator yoke, end closures forming with said yoke an enclosure for the rotor and stator cores of said machine, the stator core being spaced from a body portion of the yoke to provide ventilating passages communicating with the spaces within said end closures while preventing communication with the external air, an enclosing casing radially outside of said yoke and spaced from the body portion thereof, the space between said yoke and said enclosing casing being open to receive external air, the body portion of said yoke being apertured at spaced points, deflector means carried by said yoke and having portions projecting into the apertures in said body portion and effective to guide ventilating currents onto the outer periphery of said stator yoke, and means for causing the flow of a cooling fluid through the space between said enclosing casing and the body portion of said yoke and against the outer periphery of said stator core.

13. A dynamo-electric machine, comprising a stator frame, end closures forming with said frame an enclosure for the rotor and the winding-containing portion of the stator, said frame being formed to provide access of external air to the outer periphery of said stator core without providing access of external air to the space within said end closures, an enclosing casing radially outside of said stator and spaced from the body portion thereof, fan means outside one of said end closures for circulating air through the space between the body portion of said stator and said outer enclosing casing, an annular shield mounted in position on one end of said stator frame and associated with said outer enclosing casing and constituting a guide casing for air currents from said fan means, current collecting devices for said machine disposed outside of said latter end closure, and an enclosing casing for said current collecting devices supported by said annular shield with its periphery in position such that air drawn through said annular shield and into said ventilating space passes along and in contact with the outer periphery of said enclosing casing.

In testimony whereof, the signature of the inventor is affixed hereto.

ROBERT B. WILLIAMSON.